United States Patent [19]

Mendelsohn et al.

[11] Patent Number: 4,739,027

[45] Date of Patent: Apr. 19, 1988

[54] RESILIENT POLYURETHANE ELASTOMER

[75] Inventors: Morris A. Mendelsohn, Wilkins Township, Allegheny County; Francis W. Navish, Jr., East Pittsburgh; Rajender K. Sadhir, Plum Boro, all of Pa.

[73] Assignee: Westinghouse Electric Corp., Pittsburgh, Pa.

[21] Appl. No.: 809,707

[22] Filed: Dec. 17, 1985

[51] Int. Cl.[4] .................. C08G 18/10; C08G 18/30; C08G 18/32; F41F 3/04

[52] U.S. Cl. ........................... 528/60; 528/76; 528/77; 89/1.816

[58] Field of Search ............... 528/60, 76, 77

[56] References Cited

U.S. PATENT DOCUMENTS

| | | | |
|---|---|---|---|
| 2,948,691 | 8/1960 | Windemuth et al. | 528/60 |
| 3,114,735 | 12/1963 | Pigott | 528/60 |
| 3,798,200 | 3/1974 | Kaneko et al. | 528/60 |
| 3,897,401 | 7/1975 | Ringler et al. | 528/60 |
| 4,485,719 | 12/1984 | Mendelsohn et al. | 89/1.816 |
| 4,604,940 | 8/1986 | Mendelsohn et al. | 89/1.816 |

FOREIGN PATENT DOCUMENTS 733577 5/1966 Canada .................. 528/60

OTHER PUBLICATIONS

Mendelsohn et al., U.S. Ser. No. 707,111, filed 2/28/85.

Primary Examiner—Harold D. Anderson
Assistant Examiner—Dennis R. Daley
Attorney, Agent, or Firm—Daniel P. Cillo

[57] ABSTRACT

A resilient polyurethane elastomeric article is made from (A) a prepolymer prepared from a composition consisting essentially of diphenylmethane diisocyanate and polyoxytetramethylene glycol, and (B) a dual component chain extender consisting essentially of a low molecular weight triol and a material selected form one of 1,4-butanediol and resorcinol di-(beta-hydroxy ethyl) ether. The admixture can be used to impregnate or coat porous fabric material which upon cure and be used as relatively soft, flexible seals or shock isolator pads.

11 Claims, 3 Drawing Sheets

RESILIENT POLYURETHANE ELASTOMER

BACKGROUND OF THE INVENTION

Elastomeric materials have long been used to make shock isolator pads and launch seals for missiles. The shock isolator pads usually employ prebuckled struts to support the missile in its launch tube, provide shock mitigation, and damp vibrations. The launch seals are employed near the firing end of the missile, and must exhibit enough strength and rigidity to retain the pressure generated by the launch gases, i.e., up to about 320 lb./sq. in. at a 3½ in. missile-launch tube gap, and not invert (flip) during launch. The launch seals must also exhibit sufficient resiliency so that they can accommodate certain axial and radial displacements of the missile, eccentricities of the launch tube and missile, and intermittent variations in the width of the annular space between the missile and the launch tube.

Tolylene diisocyanate terminated polyoxytetramethylene based prepolymers, such as Adiprene L-100 or L-167, extended with 4,4'-methylenebis (orthochloroaniline)-MOCA have been used in the manufacture of both of these structural members. Both the tolylene diisocyanate and the 4,4'-methylenebis (orthochloroaniline), however, are now believed to present toxicologic elastomers that can be utilized in the manufacture of shock isolator pads and launch seals that will be in circumferential contact with launchable missiles.

Mendelsohn et al., in U.S. Pat. No. 4,485,719 solved these problems by eliminating tolylene diisocyanate and 4,4'-methylenebis (orthochloroaniline) from shock isolator pad and launch seal polyurethane formulations. Mendelsohn et al. provided elastomeric articles comprising the cured mixture of: (A) about 0.97 to 1.1 NCO equivalents of polyurethane prepolymer consisting essentially of: about 3.1 to 3.4 NCO equivalents of 4,4'-diphenylmethane diisocyanate, about 0.35 to 0.45 OH equivalents of a low molecular weight triol, such as trimethylol propane, and about 1.0 OH equivalent of polyoxytetramethylene glycol; and (B) 1.0 OH equivalent of hydroquinone di-(beta-hydroxyethyl)ether as sole chain extender per NCO equivalent of part (A) above. Extenders such as ethylene glycol, propylene glycol, butanediols, pentanediols, hexanediols, and the like, and even hydroquinone by itself, were specifically excluded.

This prepolymer, described by Mendelsohn et al., has a low shelf life at processing temperatures and the mixture is very viscous, even at 100° C., and could cause some processing problems during injection molding of small shock pads or launch seals. While this mixture, when cured, provides outstanding high modulus, highly rigid, shock pads and launch seals for certain types of missiles in certain environments, it may not be appropriate for other types of missiles having very delicate electronics and lighter weights. Also, this mixture is difficult to impregnate into porous fabric material, which could add good strength, bracing and other properties to the strictly elastomeric pads and seals. Thus, there is a need for a lower viscosity elastomeric formulation, capable of cure to a softer and more flexible article than the material taught by Mendelsohn et al. An attempt to add flexibility by changing the ratio of ingredients of Mendelsohn et al. is described in U.S. Pat. No. 4,604,940. This mixture too is very viscous at 100° C., and has problems similar to those of the earlier Mendelsohn et al patent.

SUMMARY OF THE INVENTION

The above problems have been solved and the above needs met, by providing a low viscosity admixture capable of impregnating and coating porous fabric material, such as fiberglass, graphite fabric, or aromatic polyamide fabric, and curing to a soft, flexible, polyurethane elastomer. This elastomer can be used to make annular missile launch seals and shock isolator pads.

The formulation of this invention utilizes low molecular weight triol, such as trimethylol propane, as part of a dual, two component chain extender, rather than as part of the polyurethane prepolymer. In the chain extender, the low molecular weight triol is used in combination with either 1,4-butanediol, or resorcinol di-(beta-hydroxy ethyl)ether. Hydroquinone di-(beta-hydroxy ethyl)ether is not used. The polyurethane prepolymer contains 4,4'-diphenylmethane diisocyanate in combination with polyoxytetramethylene glycol.

Very useful elastomeric shock isolator pads can comprise the cured admixture of: (A) about 0.9 to 1.1 NCO equivalents of polyurethane prepolymer containing about 2.85 to 2.95 NCO equivalents of 4,4'-diphenylmethane diisocyanate per 1.0 OH equivalent of polyoxytetramethylene glycol (about 1000 molecular weight); and (B) about 0.15 to 0.25 OH equivalent of low molecular weight triol, such as trimethylol propane, and about 0.75 to 0.85 OH equivalent of 1,4-butanediol, as a dual chain extender combination.

A useful elastomeric launch seal can comprise the cured admixture of: (A) about 0.9 to 1.1 NCO equivalents of polyurethane prepolymer prepared from a composition containing about 2.68 to 2.78 NCO equivalents of 4,4'-diphenylmethane diisocyanate per 1.0 OH equivalent of polyoxytetramethylene glycol (about 1000 molecular weight); and (B) about 0.11 to 0.21 OH equivalent of low molecular weight triol, such as trimethylol propane, and about 0.79 to 0.89 OH equivalent of resorcinol di-(Beta-hydroxy ethyl)ether, as a dual component chain extender combination. Parts (A) and (B) are reacted together in a ratio of about 1.0 equivalent NCO to 1.0 equivalent OH.

BRIEF DESCRIPTION OF THE DRAWINGS

For a better understanding of the invention, reference may be made to the preferred embodiment, exemplary of the invention, shown in the accompanying Drawings, where.

DESCRIPTION OF THE PREFERRED EMBODIMENTS

Figure 1:
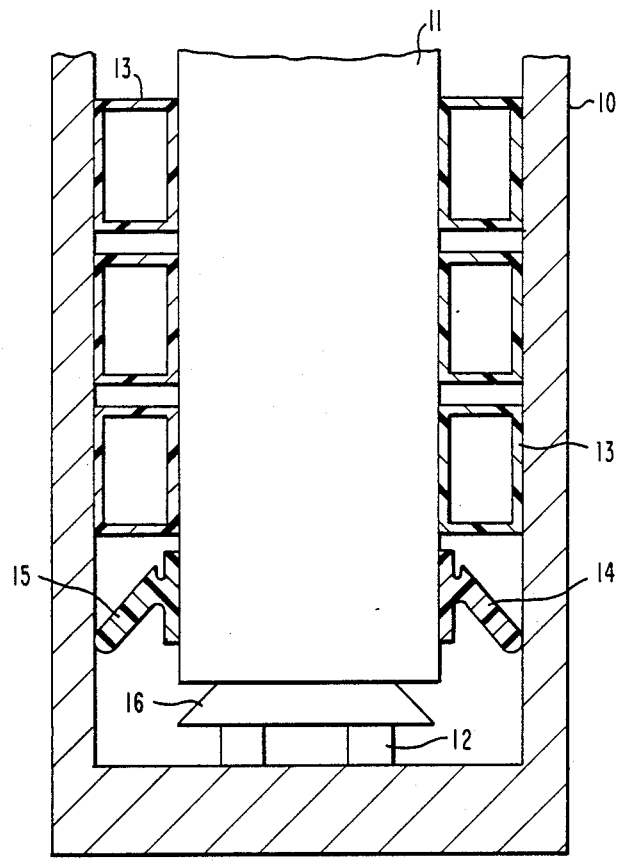
FIG. 1 shows a schematic illustration of missile mounted isolator pads and launch seals in circumferential contact with a missile and a launch tube, where the missile is at rest.

Reaction of an isocyanate and an alcohol results in the formation of a urethane:

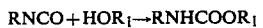

By the same reaction, polyhydroxyl materials will react with polyisocyanates to yield polyurethanes. These polyurethanes are well known in the art, and a detailed description of their synthesis can be found in *Plastics Materials*, by J. A. Brydson, D. Van Nostrand Co., 1966, pp. 484 to 504.

The isocyanate used is in this invention 4,4'-diphenylmethane diisocyanate, i.e., p,p'-diphenylmethane diisocyanate. This is the only isocyanate useful in the elastomer. It has an extremely low vapor pressure, about 1/10 that of tolylene diisocyanate, and is thus much less hazardous. It also adds much more resiliency and has a higher recovery after distortion than tolylene diisocyanate, because of its molecular symmetry.

The polyol used is polyoxytetramethylene glycol, a dihydric alcohol, i.e., $HO(CH_2CH_2CH_2CHO_2O)_nH$, where n has an average value of 12 to 15. This material is also a polyether. It also adds to the resilience of the elastomer. This polyol has a preferred molecular weight of either about 1000, or about 2000 for launch seals, or about 1000 for shock isolator pads. Both polyoxyethylene glycols and polyoxypropylene glycols are not useful in the elastomer, because of their inferior resilience characteristics, and inferior oxidative stability at moderate and elevated temperatures. Polyesters cannot be used because of their inferior hydrolytic stability.

In preparing the urethane prepolymer, the 4,4'-diphenylmethane diisocyanate (MDI) is melted, if stored in a frozen condition, and brought up to a temperature of between about 40° C. and 55° C. It is then placed in a kettle with an agitator, under a blanket of dry nitrogen gas. Polyoxytetramethylene glycol (PTMG) is melted, if stored in frozen condition, and brought up to a temperature of between about 20° C. and 50° C., after which it is added to the stirred material in the kettle, at such a rate that the temperature of the reacting material does not exceed 75° C. The contents of the kettle are then stirred under dry nitrogen at 70° C. to 80° C. for about 1 hour, to form a polyurethane prepolymer. The polyurethane prepolymer can then be stored at low temperature, as long as it is not permitted to come into contact with ambient air, because it reacts with moisture.

The above isocyanate and polyol alone are used to provide the polyurethane prepolymer in a separated step. In this invention, the triol is not part of the prepolymer but is used instead in the extender. This triol exclusion from the prepolymer is critical in providing a low viscosity admixture capable of impregnating porous materials, and capable of curing to a soft, flexible, polyurethane elastomer when the appropriate ratio of ingredients is used. The triol used as part of the dual, two component extender of this invention is a low molecular weight triol, having from 5 to 8 carbon atoms, selected from the group consisting of trimethylol pentane, trimethylol butane, trimethylol methane, trimethylol ethane and preferably trimethylol propane. The preferred trimethylol propane, $CH_3CH_2C(CH_2OH)_3$, has all three hydroxymethyl groups attached to the same carbon atom, which is in a terminal position. Materials that cannot be used include, for example, glycerol, and other polyols containing secondary and tertiary hydroxyl groups, which impart inferior thermal and hydrolytic stability.

The low molecular weight triol is used in combination with either 1,4-butanediol (BD) or resorcinol di-(beta-hydroxy ethyl)ether (HER). Both of these provide superior properties for this application of the polyurethane elastomer than hydroquinone di-(beta-hydroxy ethyl)ether (HQEE), which is not used or desired in the formulation of this invention. We have found that use of the above-described low molecular weight triols with either BD or HER present less processing difficulties than HQEE and provide an acceptable modulus, and exothermic heat of reaction, and an acceptable, controllable shrinkage, while still imparting good thermal and hydrolytic stability.

In order to add the low molecular weight triol-BD chain extender to the two component polyurethane prepolymer, the low molecular weight triol and BD are mixed at about 70° C., stored at about 25° C. until ready for use, and then mixed with degassed prepolymer which is at a temperature of about 80° C. When a low molecular weight triol-HER chain extender is to be used, the process becomes more complicated. There, the triol and HER are brought up to a temperature of between about 140° C. and 150° C., and then degassed at under about 5 Torr for about 5 minutes. They are then dropped to a temperature of between about 123° C. and 127° C., and then mixed together. Concurrently, the polyurethane prepolymer, made as heretofore described, is brought up to a temperature of between about 100° C. and 115° C. and degassed at under about 5 Torr for about 6 minutes. It is then dropped to a temperature of between about 98° C. and 102° C., at all times being protected from atmospheric moisture. The dual component chain extender, at a temperature of between about 120° C. and 130° C. is then thoroughly mixed with the polyurethane prepolymer which is maintained at a temperature of between about 90° C. and 120° C.

Mixing can be performed with a casting machine or with an air or electric-powered mixer. Thorough mixing can be accomplished in about 1 to 5 minutes, with the resultant mixture being essentially free of bubbles and striation lines. In this invention, the admixture used in applications involving impregnating of reinforcing fibers will usually have a viscosity below about 800 cps. at 100° C. and is capable of easy impregnation into a variety of porous materials. Immediately after mixing, the admixture can be poured into appropriate molds which have been coated with a mold release agent and are at a temperature of between about 100° C. and 120° C. The structural member is then demolded after about 1 to 2 hours and placed in a curing oven at a temperature of between about 100° C. and 120° C. for about 12 to 24 hours. Thus, mold dwell time is short and eliminates the high cost of procuring a large number of molds in commercial operation. Alternatively, immediately after mixing, the admixture, at a temperature of between about 40° C. to 100° C., can be coated onto and allowed to penetrate into and impregnate, for example, porous material, such as fiberglass fabric, graphite fabric, aromatic polyamide fabric or the like with ease. This fabric impregnated and coated composite can be used to provide a rigid interior composite covered with a soft, flexible elastomer. This admixture has a longer shelf life than triol included prepolymer-HQEE systems, allowing economies of article manufacture.

Regarding the component materials, the 4,4'-diphenylmethane diisocyanate (MDI) preferably should have an average isocyanate equivalent weight of about 125, and have a maximum total chlorides content of about 0.1%. The triol preferably should have a minimum hydroxyl content of about 37.5% and a maximum water content of about 0.05 wt.%. The polyoxytetramethylene glycol preferably should have a number average molecular weight of either about 975 to 1,020, or about 1,975 to 2,020 depending on the formulation, a hydroxyl number of between about 110 to 115 for the polyoxytetramethylene glycol having a number average molecular weight in the range of about 975 to 1,020, and a hydroxyl number of between about 55 and 57 for the polyoxytetramethylene glycol having a number average molecular weight in the range of about 1,975 to 2,020, acid a maximum acid number of about 0.05, and a maximum water content of about 0.03 wt.%. The 1,4-butanediol (BD) and the resorcinol di(beta-hydroxy ethyl)ether, both preferably should have a hydroxyl number (mg KOH/gram) of between about 545 to 566, and a water content of less than about 0.1 wt.%.

EXAMPLE 1

This invention encompasses one preferred specific formulation for shock isolator pads, and four preferred specific formulations for launch seals. The preferred shock isolator pad formulation (SAMPLE A) utilizes: a prepolymer (A) of about 0.9 to about 1.1 NCO equivalents of polyurethane prepolymer prepared from a composition containing about 2.85 to about 2.95 NCO equivalents of 4,4'-diphenylmethane diisocyanate (MDI) per 1.0 OH equivalent of polyoxytetramethylene glycol (PTMG) of about 1000 molecular weight; and about 1.0 equivalents of an extender (B) containing about 0.15 to about 0.25 OH equivalent of low molecular weight triol, preferably trimethylol propane (TMP), and about 0.75 to about 0.85 OH equivalent of 1,4-butanediol (BD). The sum of OH equivalents should be equal to unity.

This formulation provides an elastomer having the following properties after cure:

| | |
|---|---|
| Tensile Stress at Failure (ASTM-D412) | 5538 lb/in$^2$ |
| Ultimate Elongation (ASTM-D412) | 345% |
| Tear Strength (ASTM-D624) | 471 lb/in |
| Compression Set (ASTM-D395) | 24.9% |
| Tensile Stress (100% Elongation) (ASTM-D412) | 1247 lb/in$^2$ |
| Button Compressive Stress (20% Compression-1st Cycle) (ASTM-D575) | 1042 lb/in$^2$ |
| Button Damping Coefficient | 27.9 lb-sec/in |
| Button k Value | 2.03 × 10$^{-4}$ lb/in |
| Pad Damping C/L | 0.778 lb-sec/in$^2$ |
| Pad k/L | 485 lb/(in/in) |
| Instantaneous Set | 3.0% |

The above ASTM numbers will be applicable throughout the specification. The damping tests were conducted using standard cast compression buttons (0.5 inches thick) and flat pad samples. The buttons were precrushed 0.06 inches twice before testing and the pads were precrushed 1.2 inches before testing. The tests were conducted at 15 Hz (sine wave) with a peak to peak amplitude of 0.016 inch. Precompression was 0.05 inches (10%) for the compression buttons and 0.055 inches for the flat pads. The cyclic loads, deflections and dissipation energy per cycle in deflection controlled damping tests were recorded and the damping parameters such as quality factor (or Q value) and damping coefficient (C value) were calculated by the following formula:

Damping parameters: Q and C $$Q = \frac{\pi x \bar{p}}{4A}$$

$$C = \frac{2A}{\pi^2 f \bar{x}^2}$$

Dynamic stiffness $$k = \frac{\bar{p}}{\bar{x}}$$

where
A = dissipation energy in-lb.
$\bar{x}$ = peak to peak amplitude, in.
$\bar{p}$ = peak to peak load, lb.
f = frequency, Hz
L = pad length, in.
Q = quality factor
C = damping coefficient, lb/s/in.
k = dynamic stiffness, lb/in.

Figure 2:
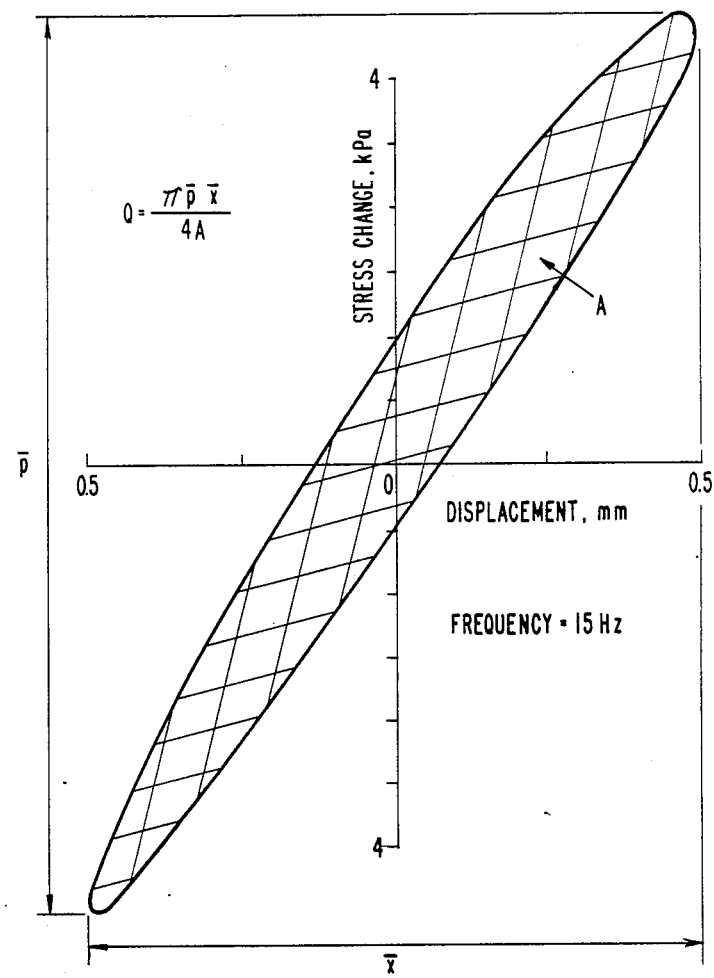
FIG. 2 shows a typical hysteresis loop for determining damping.

The damping test results of pads were given by damping coefficient per unit length of pad, C/L, and dynamic stiffness per unit length of pads k/L. A typical hysteresis loop for determining damping is shown as FIG. 2.

Figure 3:
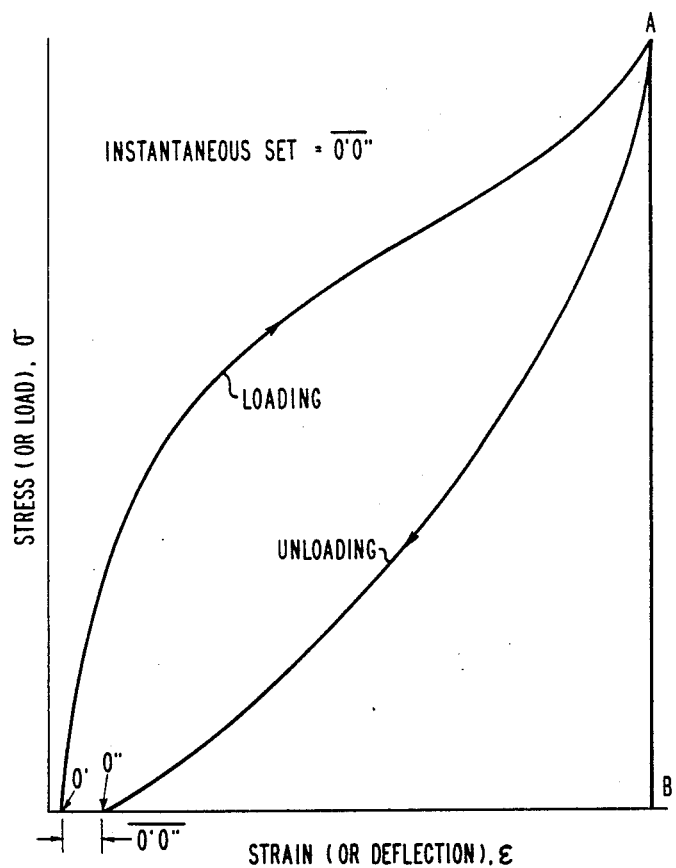
FIG. 3 shows a typical compression stress-strain curve.

Compression measurements were performed in accordance with ASTM D575-83 Method A. Cylindrical specimens were compressed 25% (i.e., to 75% of their original thickness) and then unloaded for three consecutive cycles. Instantaneous set is the difference in deflection between the start of the third loading cycle and the end of its unloading cycle (defined as the instant that the compressive load has reached zero). A typical compression stress-strain curve is shown as FIG. 3.

The prepolymer was prepared by treating 1.0 equivalent (0.5 mole) of polyoxytetramethylene glycol (PTMG) having a number average molecular weight of ~1000 with 2.90 equivalent (2.90/2 mole) 4,4'-diphenylmethane diisocyanate (MDI). Basically, the procedure involves heating and stirring the above ingredients together for 1 to 2 hours at 70° C. to 80° C. under an atmosphere of dry nitrogen.

The isolator pad was prepared by treating the above described prepolymer which contained excess diisocyanate with an equivalent stoichiometric quantity of extender. The extender was prepared by dissolving 0.20 equivalent (0.20/3 mole) TMP in 0.80 equivalent (0.80/2 mole) BD. It was stored at room temperature over non-indicating Drierite until use. After degassing the prepolymer at 80° C., it was mixed with the extender which was at 25° C. The Brookfield viscosity of the resultant admixture was from about 13,000 cps to 16,000 at 25° C. and from about 340 cps to 800 cps at 100° C. The resultant admixture was poured into a mold which was at 100° C. and cured for 16 hours at 100° C. If desired, the cast polyurethane may be demolded within 2 to 3 hours and then postcured.

EXAMPLE 2

One of the preferred launch seal formulations (SAMPLE B) utilizes: (A) about 0.9 to about 1.1 NCO equivalents of polyurethane prepolymer prepared from a composition containing about 4.00 to about 4.10 NCO equivalents of 4,4'-diphenylmethane diisocyanate (MDI) per 1.0 OH equivalent of polyoxytetramethylene glycol (PTMG) of about 2000 molecular weight; and (B) about 1.0 equivalents of extender consisting of about 0.1 to about 0.10 OH equivalent of low molecular weight triol, preferably trimethylol propane (TMP), and about 0.90 to about 0.99 OH equivalent of 1,4-butanediol (BD).

This formulation provides an elastomer having the following properties after cure:

| Tensile Stress at Failure | 5530 lb/in$^2$ |
|---|---|
| Ultimate Elongation | 540% |
| Tear Strength | 560 lb/in |

Tensile Stress:

| Elongation (%) | Stress (lb/in$^2$) |
|---|---|
| 10 | 250 |
| 20 | 460 |
| 100 | 1010 |
| 200 | 1400 |
| 300 | 1880 |

Compressive Stress (1st Cycle):

| Compressive Deflection (%) | Stress (lb/in$^2$) |
|---|---|
| 5 | 380 |
| 10 | 690 |
| 20 | 1280 |
| 25 | 1600 |

The prepolymer was prepared by treating 1.0 equivalent (0.5 mole) of polyoxytetramethylene glycol (PTMG) having a number average molecular weight of ~2000 with 4.04 equivalent (4.04/2 mole) 4,4'-diphenylmethane diisocyanate (MDI). Basically, the procedure involves heating and stirring the above ingredients together for 1 to 2 hours at 70° C. to 80° C. under an atmosphere of dry nitrogen.

The launch seal was prepared by treating the above described prepolymer which contained excess diisocyanate with an equivalent stoichiometric quantity of extender. The extender was prepared by dissolving 0.05 equivalent (0.05/3 mole) TMP in 0.95 equivalent (0.95/2 mole) BD. It was stored at room temperature over nonindicating Drierite until use. After degassing, the prepolymer at 80° C. was mixed with the dual extender which was at 25° C. The Brookfield viscosity of the resultant admixture was about 13,800 cps at 25° C. and about 650 cps at 100° C. The resultant admixture was poured into a mold which was at 110° C. and cured for 20 hours at 110° C. If desired, the cast polyurethane may be demolded within 2 to 3 hours and then postcured.

EXAMPLE 3

Another of the preferred launch seal formulations (SAMPLE C) utilizes: a prepolymer (A) of about 0.9 to about 1.1 NCO equivalents of polyurethane prepolymer prepared from a composition containing about 4.00 to about 4.10 NCO equivalents of 4,4'-diphenylmethane diisocynate (MDI) per 1.0 OH equivalent of polyoxytetramethylene glycol (PTMG) of about 2000 molecular weight; and about 1.0 equivalents of an extender (B) containing about 0.11 to about 0.21 OH equivalent of low molecular weight triol, preferably trimethylol propane (TMP), and about 0.79 to about 0.89 OH equivalent of resorcinol di-(beta-hydroxy ethyl)ether (HER).

This formulation provides an elastomer having the following properties after cure:

| Tensile Stress at Failure | 3830 lb/in$^2$ |
|---|---|
| Ultimate Elongation | 410% |
| Tear Strength | 450 lb/in |

Tensile Stress:

| Elongation (%) | Stress (lb/in$^2$) |
|---|---|
| 10 | 600 |
| 20 | 950 |
| 100 | 1600 |
| 200 | 2070 |
| 300 | 2700 |

Compressive Stress (1st Cycle):

| Compressive Deflection (%) | Stress (lb/in$^2$) |
|---|---|
| 5 | 660 |
| 10 | 1140 |
| 20 | 2000 |
| 25 | 2550 |

The prepolymer was prepared by treating 1.0 equivalent (0.5 mole) of polyoxytetramethylene glycol (PTMG) having a number average molecular weight of ~2000 with 4.04 equivalent (4.04/2 mole) 4,4'-diphenylmethane diisocyanate (MDI). Basically, the procedure involves heating and stirring stoichiometrically equivalent portions of the above ingredients together for 1 to 2 hours at 70° C. to 80° C. under an atmosphere of dry nitrogen.

The launch seal was prepared by treating the above described prepolymer which contained excess diisocyanate with an equivalent stoichiometric quantity of extender. The extender consists of 0.167 equivalent (0.167/3 mole) TMP and 0.833 equivalent (0.833/2 mole) HER. After degassing both the prepolymer and molten extenders, the prepolymer at 100° C. was mixed with the dual extender which was at 125° C. The Brookfield viscosity of the resultant admixture was about 12,840 cps at 25° C. and about 520 cps at 100° C. The resultant admixture was poured into a mold which was at 110° C. and cured for 20 hours at 110° C. If desired, the cast polyurethane may be demolded within 2 to 3 hours and then postcured.

EXAMPLE 4

Another of the launch seal formulations (SAMPLE D) utilizes: (A) about 0.9 to about 1.1 NCO equivalents of polyurethane prepolymer prepared from a composition containing about 2.68 to 2.78 NCO equivalents of 4,4'-diphenylmethane diisocyanate (MDI) per 1.0 OH equivalent of polyoxytetramethylene glycol (PTMG) of about 1000 molecular weight; and (B) about 1.0 equivalents of extender consisting of about 0.01 to about 0.10 OH equivalent of low molecular weight triol, preferably trimethylol propane (TMP), and about 0.90 to about 0.99 OH equivalent of 1,4-butanediol (BD). Components (A) and (B) are used in stoichiometrically equivalent portions.

This formulation provides an elastomer having the following properties after cure:

| Tensile Stress at Failure | 5630 lb/in$^2$ |
|---|---|
| Ultimate Elongation | 470% |

-continued

| Tear Strength | 510 lb/in |

Tensile Stress:

| Elongation (%) | Stress (lb/in$^2$) |
| --- | --- |
| 10 | 300 |
| 20 | 540 |
| 100 | 1120 |
| 200 | 1590 |
| 300 | 2320 |

Compressive Stress (1st Cycle):

| Compressive Deflection (%) | Stress (lb/in$^2$) |
| --- | --- |
| 5 | 360 |
| 10 | 720 |
| 20 | 1370 |
| 25 | 1700 |

The prepolymer was prepared by treating 1.0 equivalent (0.5 mole) of polyoxytetramethylene glycol (PTMG) having a number average molecular weight of ~1000 with 2.73 equivalent (2.73/2 mole) 4,4'-diphenylmethane diisocyanate (MDI). Basically, the procedure involves heating and stirring the above ingredients together for 1 to 2 hours at 70° C. to 80° C. under an atmosphere of dry nitrogen.

The launch seal was prepared by treating the above described prepolymer which contained excess diisocyanate with an equivalent stoichiometric quantity of extender. The extender was prepared by dissolving 0.05 equivalent (0.05/3 mole) TMP in 0.95 equivalent (0.95/2 mole) BD. It was stored at room temperature over non-indicating Drierite until use. After degassing, the prepolymer at 80° C. was mixed with the extender which was at 25° C. The Brookfield viscosity of the resultant admixture was about 16,750 cps at 25° C. and about 450 cps at 100° C. The resultant admixture was poured into a mold which was at 110° C. and cured for 20 hours at 110° C. If desired, the cast polyurethane may be demolded within 2 to 3 hours and then postcured.

EXAMPLE 5

Another of the preferred shock isolator pad formulations (SAMPLE E) utilized: (A) about 0.9 to about 1.1 NCO equivalents of polyurethane prepolymer prepared from a composition containing about 2.68 to about 2.78 NCO equivalents of 4,4'-diphenylmethane diisocyanate (MDI) per 1.0 OH equivalent of polyoxytetramethylene glycol (PTMG) of about 1000 molecular weight; and (B) about 1.0 equivalents of extender consisting of about 0.11 to about 0.21 OH equivalent of low molecular weight triol, preferably trimethylol propane (TMP), and about 0.79 to about 0.89 OH equivalent of resorcinol di-(beta-hydroxy ethyl)ether (HER). Components (A) and (B) are used in stoichiometrically equivalent portions.

This formulation provides an elastomer having the following properties after cure:

| Tensile Stress at Failure | 4000 lb/in$^2$ |
| --- | --- |
| Ultimate Elongation | 380% |

-continued

| Tear Strength | 490 lb/in |

Tensile Stress:

| Elongation (%) | Stress (lb/in$^2$) |
| --- | --- |
| 10 | 680 |
| 20 | 1150 |
| 100 | 2020 |
| 200 | 2550 |
| 300 | 3320 |

Compressive Stress (1st Cycle):

| Compressive Deflection (%) | Stress (lb/in$^2$) |
| --- | --- |
| 5 | 720 |
| 10 | 1300 |
| 20 | 2360 |
| 25 | 3000 |

The prepolymer was prepared by treating 1.0 equivalent (0.5 mole) of polyoxytetramethylene glycol (PTMG) having a number average molecular weight of ~1000 with 2.73 equivalent (2.73/2 mole) 4,4'-diphenylmethane diisocyanate (MDI). Basically, the procedure involves heating and stirring the above ingredients together for 1 to 2 hours at 70° C. to 80° C. under an atmosphere of dry nitrogen.

The launch seal was prepared by treating the above described prepolymer which contained excess diisocyanate with an equivalent stoichiometric quantity of extender. The extender consisted of 0.167 equivalent (0.167/3 mole) TMP and 0.833 equivalent (0.833/2 mole) HER. After degassing both the prepolymer and molten extender, the prepolymer at 100° C. was mixed with the dual extender which was at 125° C. The Brookfield viscosity of the resultant admixture was about 14,960 cps at 25° C. and about 330 cps at 100° C. This material would be an especially useful impregnant or coating material for porous substrates used to add structural firmness to the launch seal. The resultant of admixture was poured into a mold which was at 110° C. and cured for 20 hours at 110° C. If desired, the cast polyurethane may be demolded within 2 to 3 hours and then postcured.

Referring now to the Drawing, directed to missile mounted shock pads and pressure seals, a missile launch tube 10 is shown, surrounding a cylindrical launchable missile 11 contained in the tube at rest, and supported against the bottom of the tube by suitable supports 12. Shock isolator pads, shown as 13, are attached circumferentially around the outer missile surface on separable i.e., ejectable, base plate segments snugly fitting around the missile, and contact the launch tube bore. The isolator pads can be any number of configurations of a prebuckled box design known in the art. This elastomeric liner material must support the missile in an aligned position, provide shock mitigation, react properly with the missile during launch, and provide vibration-isolation properties compatible with the missile response characteristics.

The launch seals, shown as 14, are attached circumferentially around the outer missile surface on separable, i.e., ejectable, base ring segments snugly fitting around the missile, near the bottom firing end 16 of the missile. Both of these structural members span the annular space between the missile and the launch tube and contact both the missile and the launch tube. The launch seals 14 must exhibit resiliency and sufficient rigidity and strength to retain eject gases during launch, yet must not exert excess frictional drag on the launch tube. As shown, the beam extension 15 of the seal, having a top low pressure side and a bottom high pressure side, points downward toward the firing end of the missile. The seal can be segmented by various means about its circumference to prevent undue compressive buckling while loading the missile and in the case where the seals exit with the missile to facilitate their jettisoning.

It is to be understood that both the shock isolator pads and launch seals may also be attached to the launch tube that surrounds the missile, presenting a reusable system. There, the missile exits the launch tube, the pads and seal remain, and a new missile may be inserted without changing either the pads or seals. In the missile mounted system shown, both the pads and seals lift off with the missile and are jettisoned by a suitable ejection means after the missile clears the launch tube.

We claim:

1. A resilient polyurethane elastomeric article comprising the cured admixture:
   (A) about 0.9 to about 1.1 NCO equivalents of a polyurethane prepolymer prepared from a composition consisting essentially of:
      (1) diphenylmethane diisocyanate, and
      (2) polyoxytetramethylene glycol having a number average molecular weight only within the ranges of from about 975 to about 1,020 or from about 1,975 to about 2,020, and
   (B) about 1.0 OH equivalent of a dual component chain extender consisting essentially of:
      (1) a low molecular weight triol selected from the group consisting of trimethylol methane, trimethylol ethane, trimethylol propane, trimethylol butane, trimethylol pentane, and mixtures thereof, and
      (2) a material selected from one of 1,4-butanediol and resorcinol di-(beta-hydroxy ethyl)ether, where there is an excess of OH equivalents of (B)(2) over the triol of (B)(1), where the cured admixture provides a resilient elastomeric article.

2. The polyurethane elastomeric article of claim 1 where the prepolymer (A) is prepared from a composition consisting essentially of:
   (1) about 2.85 to about 2.95 NCO equivalents of 4,4'-diphenylmethane diisocyanate, and
   (2) 1.0 OH equivalent of polyoxytetramethylene glycol of from about 975 to about 1,020 number average molecular weight,
   and the dual component chain extender (B) consists essentially of:
   (1) about 0.15 to about 0.25 OH equivalent of a low molecular weight triol, and
   (2) about 0.75 to about 0.85 OH equivalent of 1,4-butanediol.

3. The polyurethane elastomeric article of claim 2 where the low molecular weight triol is trimethylol propane.

4. The polyurethane elastomeric article of claim 1 where the prepolymer (A) is prepared from a composition consisting essentially of:
   (1) about 4.00 to about 4.10 NCO equivalents of 4,4'-diphenylmethane diisocyanate, and
   (2) 1.0 OH equivalent of polyoxytetramethylene glycol of from about 1,975 to about 2,020 number average molecular weight,
   and the dual component chain extender (B) consists essentially of:
   (1) about 0.01 to about 0.10 OH equivalent of a low molecular weight triol, and
   (2) about 0.90 to about 0.99 OH equivalent of 1,4-butanediol.

5. The polyurethane elastomeric article of claim 4 where the low molecular weight triol is trimethylol propane.

6. The polyurethane elastomeric article of claim 1 where the prepolymer (A) is prepared from a composition consisting essentially of:
   (1) about 4.00 to about 4.10 NCO equivalents of 4,4'-diphenylmethane diisocyanate, and
   (2) 1.0 OH equivalent of polyoxytetramethylene glycol of from about 1,975 to about 2,020 number average molecular weight,
   and the dual component chain extender (B) consists essentially of:
   (1) about 0.11 to about 0.21 OH equivalent of a low molecular weight triol, and
   (2) about 0.79 to about 0.89 OH equivalent of resorcinol di-(beta-hydroxy ethyl)ether.

7. The polyurethane elastomeric article of claim 6 where the low molecular weight triol is trimethylol propane.

8. The polyurethane elastomeric article of claim 1 where the prepolymer (A) is prepared from a composition consisting essentially of:
   (1) about 2.68 to about 2.78 NCO equivalents of 4,4'-diphenylmethane diisocyanate, and
   (2) 1.0 OH equivalent of polyoxytetramethylene glycol of from a relatively low viscosity admixture containing about 975 to about 1,020 number average molecular weight,
   and the dual component chain extender (B) consists essentially of:
   (1) about 0.01 to about 0.10 OH equivalent of a low molecular weight triol, and
   (2) about 0.90 to about 0.99 OH equivalent of 1,4-butanediol.

9. The polyurethane elastomeric article of claim 8 where the low molecular weight triol is trimethylol propane.

10. The polyurethane elastomeric article of claim 1 where the prepolymer (A) is prepared from a composition consisting essentially of:
    (1) about 2.68 to about 2.78 NCO equivalents of 4,4'-diphenylmethane diisocyanate, and
    (2) 1.0 OH equivalent of polyoxytetramethylene glycol of from about 975 to about 1,020 number average molecular weight,
    and the dual component chain extender (B) consists essentially of:
    (1) about 0.11 to about 0.21 OH equivalent of a low molecular weight triol, and
    (2) about 0.79 to about 0.89 OH equivalent of resorcinol di-(beta-hydroxy ethyl)ether.

11. The polyurethane elastomeric article of claim 10 where the low molecular weight triol is trimethylol propane.

* * * * *